(12) United States Patent
Hamabe et al.

(10) Patent No.: US 11,444,388 B2
(45) Date of Patent: Sep. 13, 2022

(54) RADIO WAVE MEASUREMENT DEVICE

(71) Applicant: Panasonic Corporation, Osaka (JP)

(72) Inventors: Taichi Hamabe, Kanagawa (JP);
Masami Saito, Kanagawa (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 43 days.

(21) Appl. No.: 17/115,177

(22) Filed: Dec. 8, 2020

(65) Prior Publication Data

US 2021/0184370 A1 Jun. 17, 2021

(30) Foreign Application Priority Data

Dec. 12, 2019 (JP) .............................. JP2019-224794

(51) Int. Cl.
*H01Q 21/06* (2006.01)
*H01Q 1/42* (2006.01)
*H04B 3/52* (2006.01)

(52) U.S. Cl.
CPC ............. *H01Q 21/065* (2013.01); *H01Q 1/42* (2013.01); *H04B 3/52* (2013.01); *H04B 2203/5441* (2013.01)

(58) Field of Classification Search
CPC .......... H04B 1/525; H04B 1/38; H04B 1/006; H04B 1/0458; H04B 1/0475; H04B 1/1027; H04B 1/109; H04B 1/18; H04B 1/40; H04B 1/406; H04B 1/52; H04B 17/12; H04B 2001/045; H04B 7/0413; H04B 7/0486; H04B 7/0602; H04B 7/0613; H04B 7/08; H04B 7/10; H04B 7/15; H04B 7/15585; H04B 7/15592; H04B 7/22; H01Q 21/205; H01Q 21/29; H01Q 1/002; H01Q 1/007; H01Q 1/22; H01Q 1/2291; H01Q 1/273; H01Q 1/32; H01Q 1/38; H01Q 1/50; H01Q 15/08; H01Q 21/06; H01Q 21/065;

(Continued)

(56) References Cited

U.S. PATENT DOCUMENTS 6,400,337 B1 * 6/2002 Handelsman .......... H01Q 21/06
  343/742
6,643,522 B1 * 11/2003 Young ................... H04B 1/406
  455/552.1

(Continued)

FOREIGN PATENT DOCUMENTS

JP 2013-110510 6/2013

*Primary Examiner* — Linh V Nguyen
(74) *Attorney, Agent, or Firm* — Wenderoth, Lind & Ponack, L.L.P.

(57) ABSTRACT

A radio wave measurement device includes: a transmission antenna; a reception antenna; a main circuit configured to output a transmission signal to the transmission antenna and measure a strength of a reception signal received with the reception antenna; a connection circuit disposed between the main circuit and the reception antenna, and configured to reduce flowing of the transmission signal into the reception antenna; at least one isolator disposed between the connection circuit and the reception antenna, and configured to reduce flowing of the transmission signal into the reception antenna; and a coupler disposed between the reception antenna and the at least one isolator, the coupler being configured to distribute the reception signal to the main circuit and an external signal-waveform measurement device.

9 Claims, 8 Drawing Sheets

(58) Field of Classification Search
CPC ........ H01Q 21/24; H01Q 21/28; H01Q 25/04; H01Q 7/08; H01Q 9/04; H01Q 9/0407
USPC .......................... 343/786, 703, 702, 824, 835
See application file for complete search history.

(56) References Cited

U.S. PATENT DOCUMENTS

| | | | | |
|---|---|---|---|---|
| 6,738,026 | B1* | 5/2004 | McKivergan | H01Q 9/42 343/893 |
| 6,961,019 | B1* | 11/2005 | McConnell | H04B 1/3805 455/295 |
| 7,187,904 | B2* | 3/2007 | Gainey | H04B 7/12 455/22 |
| 7,397,868 | B2* | 7/2008 | Shi | H03G 3/3042 375/316 |
| 7,525,481 | B2* | 4/2009 | Leinonen | G01S 19/21 455/302 |
| 8,779,983 | B1* | 7/2014 | Lam | H01Q 25/00 343/700 MS |
| 2008/0287076 | A1* | 11/2008 | Shen | H04B 1/0475 455/114.3 |
| 2016/0028375 | A1* | 1/2016 | Feldman | H04B 1/0458 455/193.1 |
| 2017/0078013 | A1* | 3/2017 | Sanderovich | H04B 7/10 |
| 2018/0198212 | A1* | 7/2018 | Rodríguez | H01Q 9/16 |
| 2020/0227826 | A1* | 7/2020 | Washakowski | H01Q 21/22 |
| 2020/0243957 | A1* | 7/2020 | Ueda | H01Q 21/205 |
| 2020/0303837 | A1* | 9/2020 | Anderson | H01Q 3/247 |
| 2021/0359754 | A1* | 11/2021 | Talla | H04L 5/14 |

\* cited by examiner

RADIO WAVE MEASUREMENT DEVICE

BACKGROUND

1. Technical Field

The present disclosure relates to radio wave measurement devices.

2. Description of the Related Art

Radio communication devices which simultaneously perform transmission and reception have conventionally had a problem of loop interference caused by a transmission signal sneaking into their receiving circuit. A technology has been used with which such loop interference is removed by producing a replica of an interference signal followed by subtracting the replica of the interference signal from a reception signal. Unfortunately, the technology has a problem of poor accuracy of removal of interference because, in cases where the autocorrelation of a transmission signal is poor, correlation is sometimes erroneously detected in estimating propagation paths. To address this problem, Patent Literature 1 discloses a radio communication device which calculates the autocorrelation of a transmission signal and detects correlation for estimating propagation paths only while the autocorrelation is not poor.

Patent Literature 1 is Japanese Patent Unexamined Publication No. 2013-110510.

SUMMARY

The present disclosure is devised in view of the above-described situation in the related art, and an object of the present disclosure is to provide a radio wave measurement device that reduces sneaking of a transmission signal into its receiving circuit and is capable of performing a simultaneous measurement of both the radio field intensity of a reception signal and the signal waveform of the reception signal, thereby supporting efficient measurements of radio wave environments.

The present disclosure provides the radio wave measurement device that includes: a transmission antenna; a reception antenna; a main circuit configured to output a transmission signal to the transmission antenna and measure a strength of a reception signal received with the reception antenna; a connection circuit disposed between the main circuit and the reception antenna, and configured to reduce flowing of the transmission signal into the reception antenna; at least one isolator disposed between the connection circuit and the reception antenna, and configured to reduce flowing of the transmission signal into the reception antenna; and a coupler disposed between the reception antenna and the at least one isolator, the coupler being configured to distribute the reception signal to the main circuit and an external signal-waveform measurement device.

In accordance with the present disclosure, it is possible to reduce the sneaking of the transmission signal into the receiving circuit, which allows a simultaneous measurement of both the radio field intensity of the reception signal and the signal waveform of the reception signal. This enables support for efficient measurements of radio wave environments.

DETAILED DESCRIPTION

Underlying Knowledge Forming Basis of the Present Disclosure

In evaluating a radio wave environment at the disposition site of an antenna, there are cases, for example, where a Received Signal Strength Indicator (RSSI) value is measured which indicates the strength of a reception signal (i.e. a received radio wave) received by the antenna. Since the RSSI value, however, is nothing more than an instantaneous measured value, use of the value alone is not enough to evaluate the radio wave environment. For example, in cases where obstruction waves such as much noise are present in the surroundings or where there exist radio signals from a source using a frequency band close to communication frequencies to the extent to which the radio signals can interfere with the communication, the RSSI value is influenced by such obstruction waves or radio signals to become large, in spite of the environment being unsuitable for radio communication.

Figure 7:
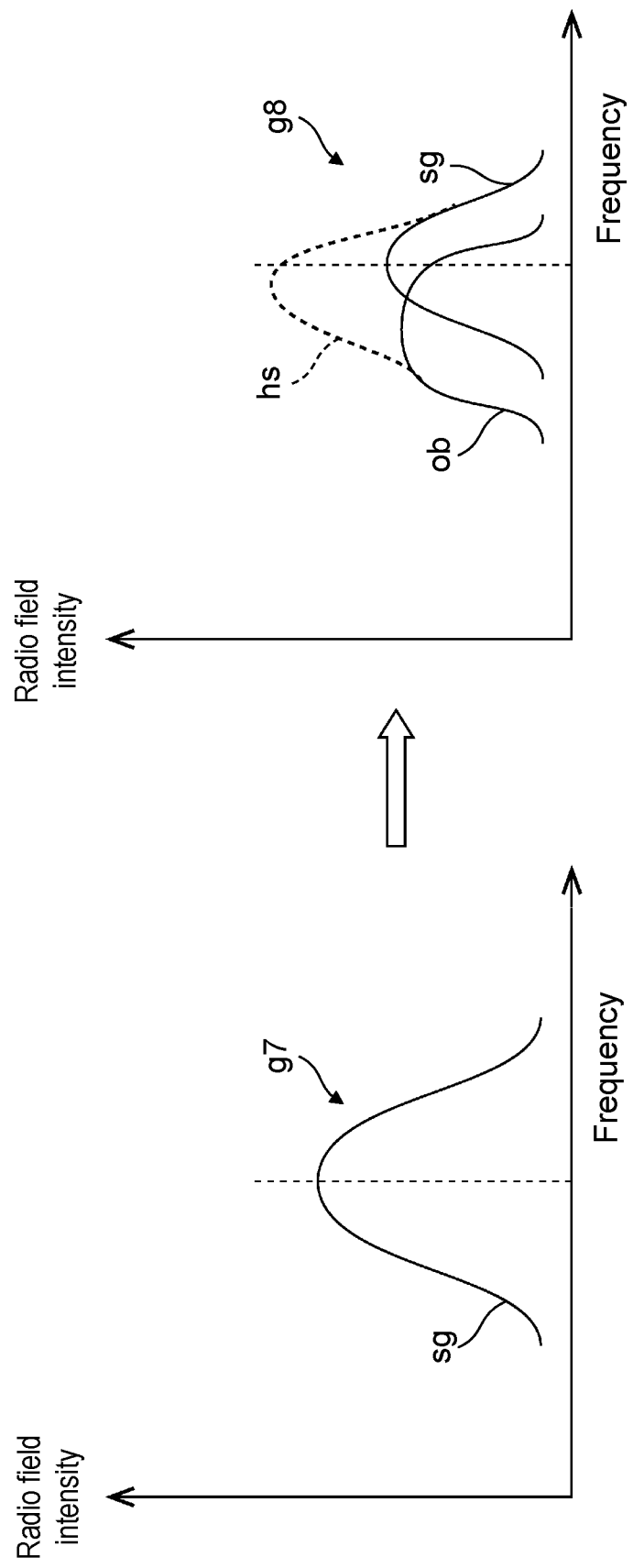
FIG. 7 is a graph showing an example of an influence of an obstruction wave on a radio field intensity.

FIG. 7 is a graph showing an example of an influence of an obstruction wave on a radio field intensity. The longitudinal axis of FIG. 7 indicates a radio field intensity (e.g. RSSI), and the horizontal axis of FIG. 7 indicates a frequency. For example, in the case where a radio wave emitted by a specific access point is received in the environment without obstruction waves, the RSSI value becomes highest at the peak position at a frequency corresponding to that of radio wave "sg" emitted by the access point, as shown in graph g7. When the RSSI value equals a threshold value or higher, the radio wave environment at the surroundings of the receiving location is determined to be good. However, in the presence of obstruction wave "ob" that overlaps with radio wave "sg" emitted by an access point, at the peak position at a frequency corresponding to that of radio wave "sg" emitted by the access point, the RSSI value rises by an amount corresponding to the received field intensity of obstruction wave "ob" up to the value for apparent radio wave "hs," as shown in graph g8. Thus the RSSI value becomes higher than the true value. For this reason, in spite of the radio wave environment being actually poor, there has been a possibility that the radio wave environment may be erroneously determined to be good.

Moreover, propagation characteristics of a radio wave may always vary. Therefore, use of the RSSI measured value alone is not sufficient for the evaluation, and it is thought that characteristics (e.g. a signal waveform) of the signal received with the antenna are also required to be measured at the same time. Patent Literature 1 as well discloses nothing regarding the point that characteristics, in addition to the RSSI, of the signal received with the antenna should be measured. Therefore, in addition to measuring the RSSI value of the received radio wave, it is required to confirm the presence or absence of obstruction waves by observing the signal waveform of the received radio wave at the time of reception of the radio wave.

Figure 8:
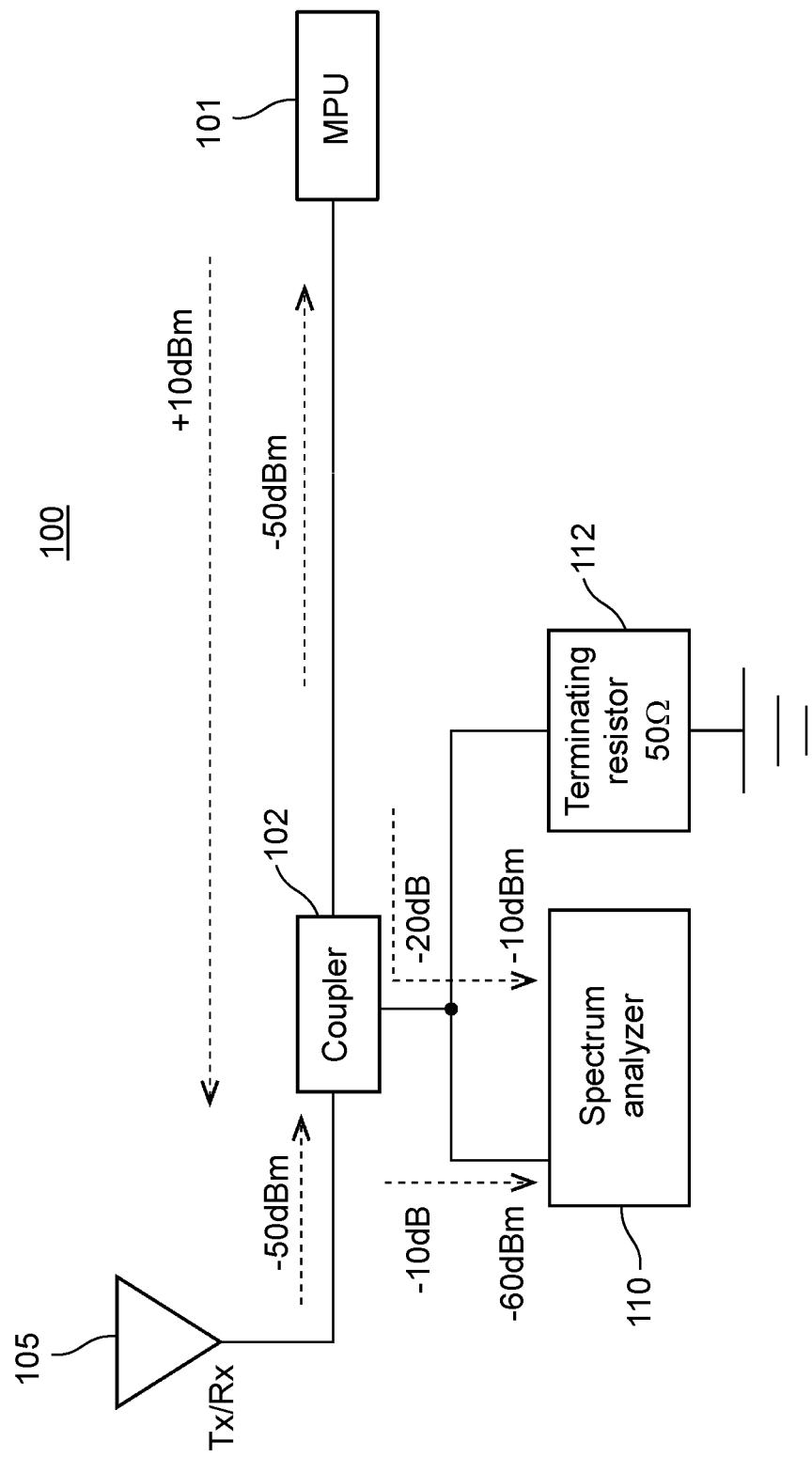
FIG. 8 is a schematic configuration diagram illustrating an example of a radio wave measurement device according to a comparative example.

Now, with reference to FIG. 8, a description is made regarding an exemplary configuration of a radio wave measurement device according to a comparative example. The device is intended not only to measure the RSSI but also to simultaneously observe the signal waveform of a signal received with an antenna. FIG. 8 is a schematic configuration diagram illustrating an example of radio wave measurement device 100 according to the comparative example.

In an area to be measured, radio wave measurement device 100 emits a radio wave (e.g. a beacon) and also receives radio weaves emitted by other radio wave transmitters such as an access point. Radio wave measurement device 100 includes: Micro Processing Unit (MPU) 101, coupler 102, transmission-and-reception shared antenna 105, spectrum analyzer 110, and terminating resistor 112 (e.g. 50Ω). In cases where MPU 101 sends (feeds) a beacon signal to transmission-and-reception shared antenna 105 via coupler 102, the intensity of the radio wave emitted from transmission-and-reception shared antenna 105 is +10 dBm as one example. Moreover, in cases where transmission-and-reception shared antenna 105 receives a radio wave emitted from other radio communication device, the intensity of the received radio wave is −50 dBm as one example. Furthermore, the intensity of the received radio wave, when distribute by coupler 102 serving as a directional coupler, decreases by −10 dB, for example. Spectrum analyzer 110 is fed with the reception signal having a reception strength of −60 dBm [=−50 dBm+(−10 dB)]. On the other hand, it is considered that the beacon signal sent (fed) from MPU 101 is reduced by −20 dB by coupler 102 and sneaks into spectrum analyzer 110. The occurrence of such sneaking-in of the beacon signal causes the beacon signal of −10 dBm (=+10 dBm−20 dB) to enter spectrum analyzer 110.

As a matter of fact, however, in the case where the waveform of the radio wave received with spectrum analyzer 110 was observed, the waveform of the received radio wave could not be observed. This is because the waveform of the reception signal having such a small radio field intensity of −60 dBm, was buried (hidden) in the waveform of the beacon signal having such a large radio field intensity of −10 dBm. As countermeasures against this, an amplifier might be expected to be inserted in the input side of spectrum analyzer 110 so as to increase the reception signal of the received radio wave. Unfortunately, it is considered that the beacon signal, since being also increased at the same time, will excess the allowable input range of the spectrum analyzer. Alternatively, an attenuator might be expected to be inserted in the input side of the spectrum analyzer so as to decrease the beacon signal. Unfortunately, it is considered that the reception signal of the received radio wave, since being also decreased at the same time, will be buried in floor noise.

Against this backdrop, an exemplary radio wave measurement device according to a first embodiment will be described below which is capable of measuring the RSSI value of a received radio wave and simultaneously observing the waveform of the radio wave, without being influenced by a beacon signal and floor noise which both sneak into the input of a spectrum analyzer.

Hereinafter, detailed descriptions will be made regarding the radio wave measurement device specifically-disclosed according to the embodiment of the present disclosure, with reference to the accompanying drawings as deemed appropriate. However, descriptions in more detail than necessary will sometimes be omitted. For example, detailed descriptions of well-known items and duplicate descriptions of substantially the same configuration will sometimes be omitted, for the sake of brevity and easy understanding by those skilled in the art. Note that the accompanying drawings and the following descriptions are presented to facilitate fully understanding of the present disclosure by those skilled in the art and, therefore, are not intended to impose any limitations on the subject matter described in the appended claims.

First Embodiment

Figure 1:
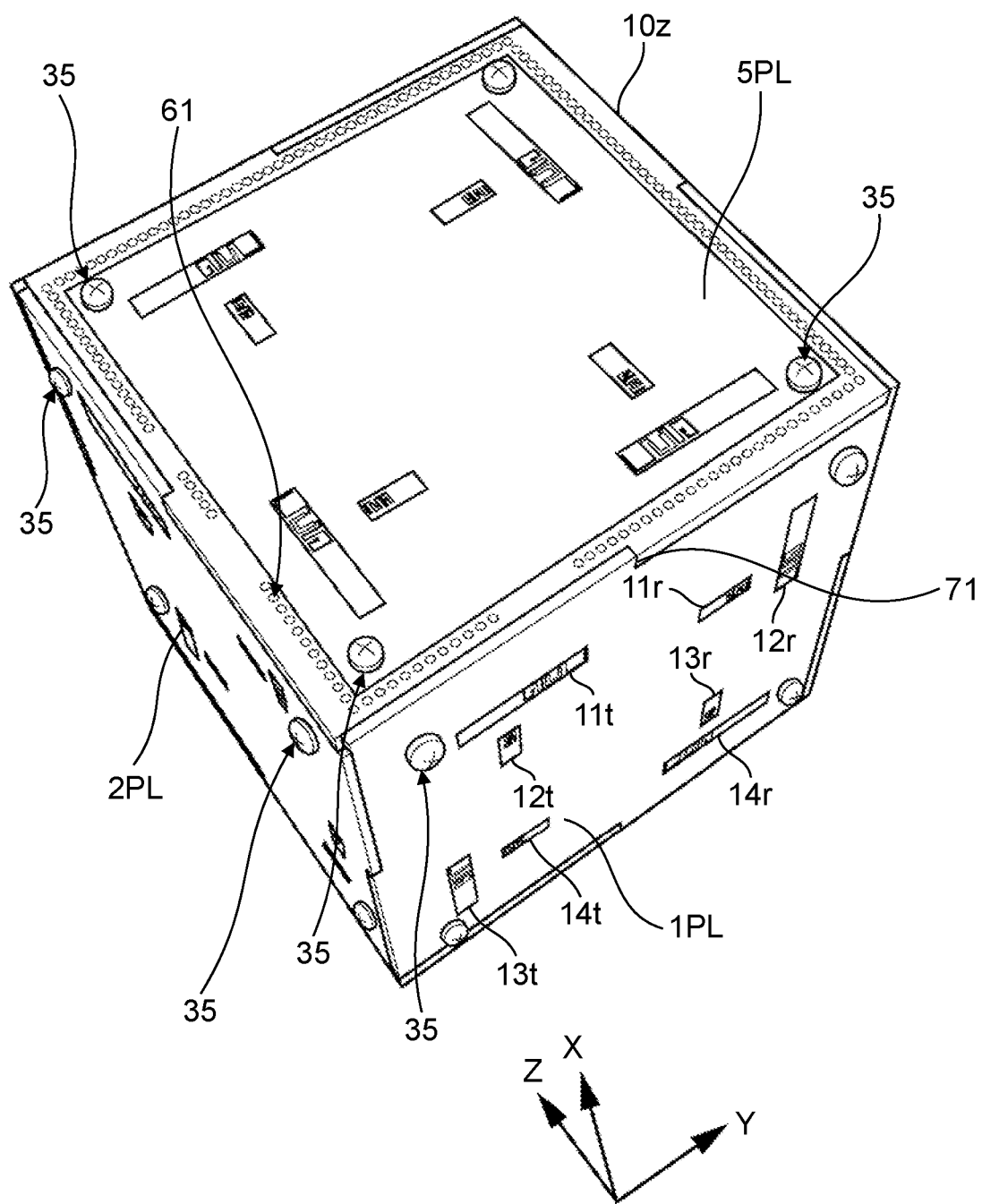
FIG. 1 is a perspective external view of an example of a radio wave measurement device according to a first embodiment.

FIG. 1 is a perspective external view of an example of radio wave measurement device 10 according to the first embodiment. In FIG. 1, the +X and −X directions indicate the up and down directions of housing 10z of radio wave measurement device 10; the −Y and +Y directions indicate the left and right directions of the housing of radio wave measurement device 10; the −Z and +Z directions indicate the front and rear directions of the housing of radio wave measurement device 10. Radio wave measurement device 10 includes housing 10z having a square column shape (either a rectangular parallelepiped shape or a cube shape, for example). Antenna units 1 to 6 are disposed on respective six surfaces (specifically, front face 1PL, left face 2PL, a rear face, a right face, top face 5PL, and a bottom face) that constitute housing 10z. These six surfaces serve as rectangular antenna-arrangement surfaces, and antenna units 1 to 6 configure a hexahedron antenna.

Radio wave measurement device 10 includes: laminated substrates serving as surface members configuring the device's respective faces; and a frame body included inside the housing of radio wave measurement device 10. The surface members and the frame body constitute a polyhedron (e.g. hexahedron) so as to configure housing 10z of radio wave measurement device 10. Housing 10z of radio wave measurement device 10 has a hexahedron shape, i.e. a cube shape as one example. The laminated substrates are attached to the respective faces of the cube with, for example, fixing screws 35. Note that the surface members configuring housing 10z of radio wave measurement device 10 are not limited to the laminated substrates. Moreover, the polyhedron is not limited to the hexahedron, and may be another shape such as a tetrahedron or a dodecahedron.

The same number of pairs of a transmission antenna and a reception antenna are mounted on each of the laminated substrates: on top face 5PL, on the four side faces (e.g. front face 1PL, left face 2PL, the right face, and the rear face), and on the bottom face. Radio wave measurement device 10 is capable of receiving radio waves coming from a total of six directions with these reception antennas, and capable of transmitting beacons in the total of six directions from these transmission antennas. Note that, in cases where radio wave measurement device 10 is fixed on a predetermined mounting surface and is used to measure radio waves, the laminated substrate on the bottom face of housing 10z may be omitted. Moreover, the laminated substrates are each formed in a quadrilateral shape, for example. Each of the laminated substrates has edges. Then each edge is provided with one stepped part 71 at a center portion of the edge such that the stepped part forms the boundary between a recessed and a protruding edge's part formed in the direction along the edge. That is, housing 10z of radio wave measurement device 10 is assembled by fitting the recessed and the protruding edge's part of the adjacent laminated substrates into each other.

Moreover, housing 10z of radio wave measurement device 10 is directly fixed to a pedestal (not shown), so that any (e.g. the bottom face) of the device's faces is attached to the pedestal. Alternatively, the device is fixed to the pedestal, with any of the device's faces being separated from the pedestal by a certain distance. The bottom face of the pedestal is wheeled. Travelling the pedestal by driving the wheels allows radio wave measurement device 10 to be moved freely to any location in an area to be measured.

Figure 2:
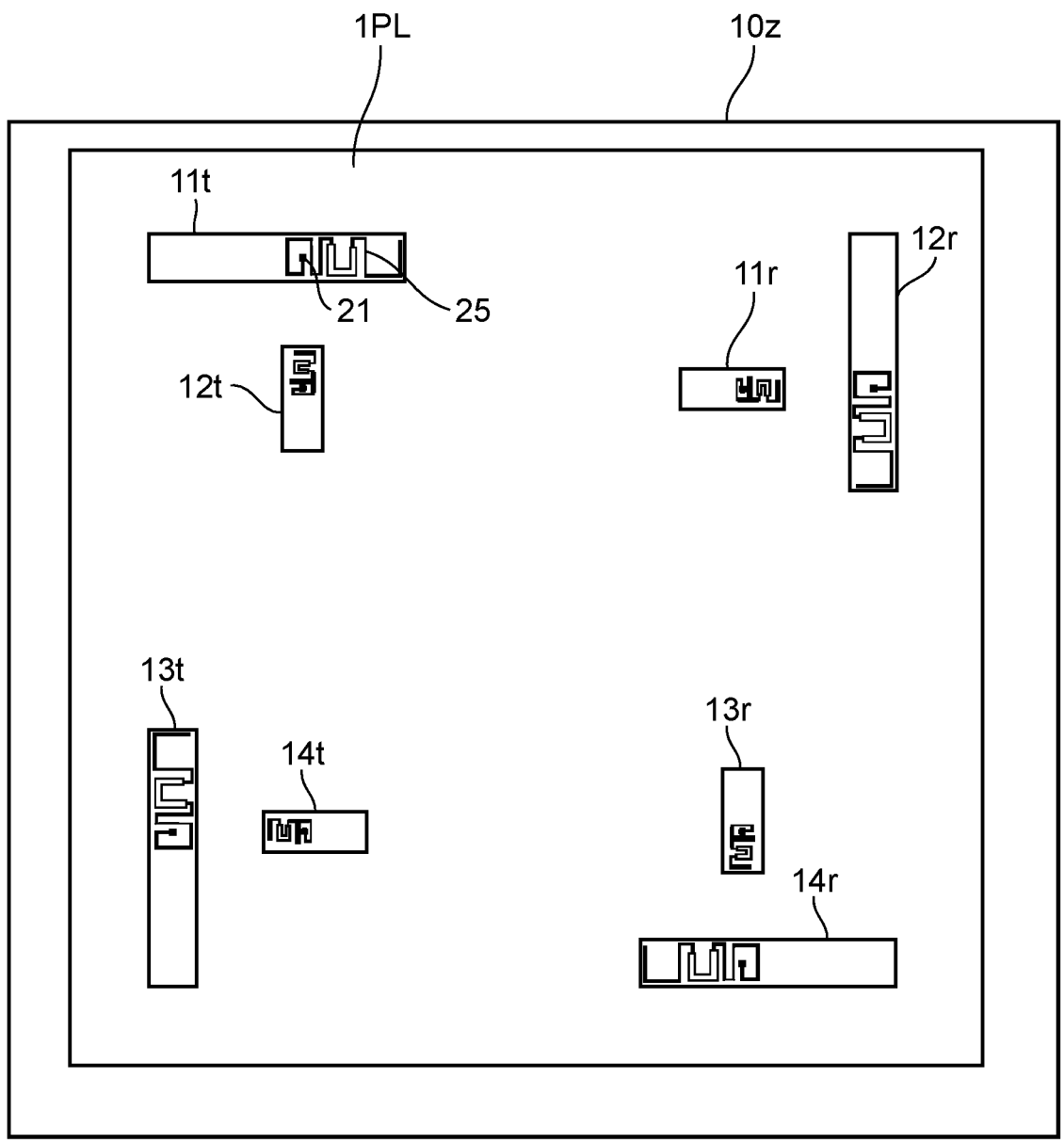
FIG. 2 is a diagram illustrating four transmission antennas and four reception antennas which all are disposed on one face of a hexahedron antenna.

FIG. 2 is a diagram illustrating four transmission antennas 11t, 12t, 13t, and 14t, and four reception antennas 11r, 12r, 13r, and 14r which all are disposed on front face 1PL of the hexahedron antenna. Transmission antenna 11t is disposed at the upper left of front face 1PL and is a 2.4 GHz antenna to transmit horizontally polarized radio waves. Transmission antenna 12t is disposed at the upper left of front face 1PL and is a 5 GHz antenna to transmit vertically polarized radio waves. Transmission antenna 13t is disposed at the lower left of front face 1PL and is a 2.4 GHz antenna to transmit vertically polarized radio waves. Transmission antenna 14t is disposed at the lower left of front face 1PL and is a 5 GHz antenna to transmit horizontally polarized radio waves.

Reception antenna 11r is disposed at the upper right of front face 1PL and is a 5 GHz antenna to receive horizontally polarized radio waves. Reception antenna 12r is disposed at the upper right of front face 1PL and is a 2.4 GHz antenna to receive vertically polarized radio waves. Reception antenna 13r is disposed at the lower right of front face 1PL and is a 5 GHz antenna to receive vertically polarized radio waves. Reception antenna 14r is disposed at the lower right of front face 1PL and is a 2.4 GHz antenna to receive horizontally polarized radio waves.

Four transmission antennas 11t to 14t and four reception antennas 11r to 14r are each configured with a patch antenna easy to downsize. Here, each of the patch antennas is capable of either transmitting or receiving radio waves in an either 2.4 GHz or 5 GHz band, as one example. Moreover, the patch antenna is formed in a rectangle shape, for example, and is capable of efficiently emitting radio waves, with the polarization direction of waves matching the longitudinal direction of the antenna. The patch antenna includes a substrate having a three-layer structure in which there are laminated a lower layer being a ground surface, a middle layer being a feed surface, and an upper layer being an antenna surface. Each of a plurality of the layers is made including copper foil and glass epoxy, for example. The antenna surface is provided with a patch for emitting radio waves in the 2.4 GHz or 5 GHz band. The patch has characteristics of a parallel resonant circuit, and either emits a beacon (i.e. a radio wave) in the 2.4 GHz or 5 GHz band when excited by a beacon signal fed to feed point 21, or receives radio waves in the 2.4 GHz or 5 GHz band. The feed surface is provided with feed point 21 and stub 25. Stub 25 has characteristics of a series resonant circuit connected in series to the patch for achieving impedance matching, and is electromagnetically coupled or electrically connected to the patch. That is, stub 25 is connected in series to the patch, thereby causing the reactance component of the patch antenna to approach zero. The ground surface is provided with a contact point of a feed conductor for power-feeding to the patch antenna.

Moreover, on each of the rectangular antenna-arrangement surfaces of housing 10z where transmission antennas 11t to 14t and reception antennas 11r to 14r are disposed, transmission antennas 11t and 13t for transmitting radio waves in the 2.4 GHz band are respectively disposed outside transmission antennas 12t and 14t for transmitting radio waves in the 5 GHz band. Reception antennas 12r and 14r for receiving radio waves in the 2.4 GHz band are respectively disposed outside reception antennas 11r and 13r for receiving radio waves in the 5 GHz band. This configuration allows radio wave measurement device 10 to be such that, in the rectangular antenna-arrangement surface, these antennas, i.e. transmission antennas 11t to 14t and reception antennas 11r to 14r, are disposed close to each other. Therefore, radio wave measurement device 10 can include many transmission and reception antennas arranged on the device without making housing 10z, a hexahedron, larger in size.

Note that the transmission antennas and the reception antennas are not limited to the patch antennas, and may be configured with other antenna elements including a dipole antenna. For the dipole antenna, the pattern of a dipole antenna is formed by patterning, by etching or any other process, metal foil formed on the surface of a laminated substrate, for example. Moreover, on the laminated substrate, an Artificial Magnetic Conductor (AMC) may be formed. The AMC has Perfect Magnetic Conductor (PMC) characteristics and is formed through use of a designated metal pattern.

Figure 3:
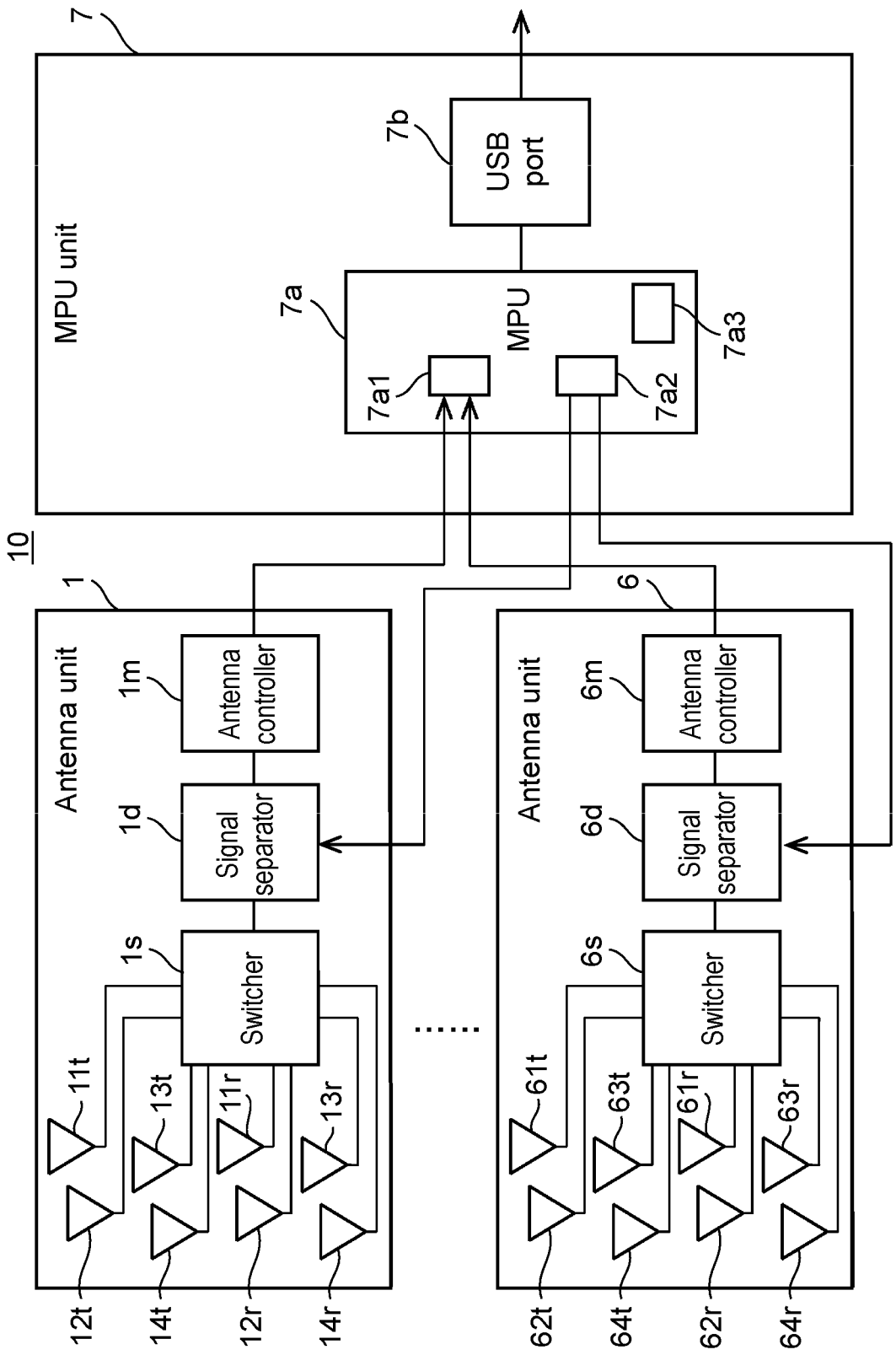
FIG. 3 is a block diagram illustrating an example of a hardware configuration of the radio wave measurement device according to the first embodiment.

FIG. 3 is a block diagram illustrating an example of a hardware configuration of radio wave measurement device 10 according to the first embodiment. Radio wave measurement device 10 is configured to include antenna units 1 to 6 and MPU unit 7. Since the configurations of antenna units 1 to 6 are the same, a description is made regarding only antenna unit 1 and descriptions of the other antenna units are omitted, for the sake of brevity, unless it is particularly necessary. Antenna unit 1 includes: four transmission antennas 11t to 14t, four reception antennas 11r to 14r, switcher 1s, signal separator 1d, and antenna controller 1m.

Using antenna unit 1 among antenna units 1 to 6, radio wave measurement device 10 is capable of transmitting radio waves, in a time division manner, from four transmission antennas 11t to 14t that are disposed in antenna unit 1. Four transmission antennas 11t to 14t transmit beacons (radio waves in the 2.4 GHz or 5 GHz band, for example) to other radio wave measurement devices in an area to be measured. Of four transmission antennas 11t to 14t, transmission antennas 11t and 14t send horizontally polarized radio waves and transmission antennas 12t and 13t send vertically polarized radio waves. Moreover, transmission antennas 11t and 13t send radio waves in the 2.4 GHz band, and transmission antennas 12t and 14t send radio waves in the 5 GHz band.

Using antenna unit 1 among antenna units 1 to 6, radio wave measurement device 10 is capable of receiving radio waves, in a time division manner, with four reception antennas 11r to 14r that are disposed in antenna unit 1. Of four reception antennas 11r to 14r, reception antennas 11r and 14r receive horizontally polarized radio waves, and reception antennas 12r and 13r receive vertically polarized radio waves. Moreover, reception antennas 11r and 13r receive radio waves in the 5 GHz band, and reception antennas 12r and 14r receive radio waves in the 2.4 GHz band.

Reception antennas 11r to 14r may receive radio waves including: a radio wave sent from a wireless access point, a beacon (i.e. radio wave) sent from another radio wave measurement device, and a beacon that is transmitted by the device itself and reflected from something in the area.

Four transmission antennas 11t to 14t are each connected to switcher 1s and any one of them is selected for as an antenna for transmission. Likewise, four reception antennas 11r to 14r are each connected to switcher 1s and any one of them is selected for as an antenna for reception.

Switcher 1s operates in accordance with a switch switching signal which is fed, in a time division manner, from switch switching controller 7a2 of MPU 7a to each of rectangular antenna-arrangement surfaces of housing 10z. That is, according to the signal, the switcher selectively connects, to antenna controller 1m, four transmission antennas 11t to 14t and four reception antennas 11r to 14r. Switcher 1s receives a beacon signal from MPU 7a via signal separator 1d, and outputs the beacon signal to any antenna that is selected from four transmission antennas 11t to 14t in accordance with the switch switching signal. Switcher 1s receives a reception signal fed from any antenna that is selected from four reception antennas 11r to 14r in accordance with the switch switching signal, and outputs the reception signal to MPU 7a and spectrum analyzer 80 (see FIG. 4), via signal separator 1d.

Antenna controller 1m is configured using a circuit (module) for wireless signals in conformity with standards for handling wireless signals conforming to Wi-SUN (registered trademark), for example. Antenna controller 1m takes out the reception signal fed from four reception antennas 11r to 14r connected to switcher 1s, as data in a parallel form (for example, the received field intensity of a radio wave transmitted from a wireless transmitter), and outputs the parallel data to data converter 7a1 of MPU 7a.

MPU unit 7 includes Micro Processing Unit (MPU) 7a, and Universal Serial Bus (USB) port 7b. MPU 7a functions as a controller for radio wave measurement device 10, and so it performs: control processing for overall controlling the operation of each part of radio wave measurement device 10; input/output processing of data to and from each part of radio wave measurement device 10; arithmetic processing of data; and storage processing of data. MPU 7a includes: data converter 7a1, switch switching controller 7a2, and memory 7a3.

In the area, MPU 7a generates a beacon signal to be used for transmitting a beacon (radio wave) to other radio wave measurement devices, and sends out the beacon signal to switcher 1s. MPU 7a uses the data received from antenna controller 1m to measure the RSSI value of the received radio wave. Moreover, MPU 7a is capable of calculating the received power of the received radio wave at the location in the area, on the basis of the measured RSSI value.

Data converter 7a1 is configured using a Universal Asynchronous Receiver/Transmitter (UART) circuit, for example, and converts the data in a parallel form fed from each of the antenna controllers (e.g. antenna controllers 1m to 6m) into data in a serial form. The data (for example, the received field intensity of a radio wave transmitted from a wireless transmitter) are fed to a measurement equipment connected to radio wave measurement device 10, via USB port 7b. Examples of the measurement equipment include: a network analyzer, and a Personal Computer (PC).

Switch switching controller 7a2 generates a switch switching signal, in a time division manner, that is to be used for feeding, to MPU unit 7, the outputs from four reception antennas 11r to 14r which are disposed on any of the six surfaces constituting housing 10z of radio wave measurement device 10. Moreover, switch switching controller 7a2 generates a switch switching signal, in a time division manner, that is to be used for sending out beacon signals to four transmission antennas 11t to 14t which are disposed on any of the six surfaces constituting housing 10z of radio wave measurement device 10. Switch switching controller 7a2 is capable of generating a switch switching signal that allows simultaneous selection of both the feeding of the output from any of four reception antennas 11r to 14r and the sending out to any of four transmission antennas 11t to 14t.

Switch switching controller 7a2 includes General Purpose Input/Output (GPIO) terminals, and outputs the switch switching signal generated, in a time division manner, to the switchers (e.g. switchers 1s to 6s) of the respective faces via the GPIO terminals. In accordance with the corresponding switch switching signal, each of switchers 1s, . . . , and 6s carries out switching among the transmission antennas sequentially every predetermined period of time; the transmission antennas are included in a corresponding one of; a set of four transmission antennas 11t to 14t of antenna unit 1, . . . , and a set of four transmission antennas 61t to 64t of antenna unit 6. Moreover, in accordance with the corresponding switch switching signal, each of switchers 1s, . . . , and 6s carries out switching among the reception antennas sequentially every predetermined period of time; the reception antennas are included in a corresponding one of; a set of four reception antennas 11r to 14r of antenna unit 1, . . . , and a set of four reception antennas 61r to 64r of antenna unit 6. The outputs from the four reception antennas are fed to MPU 7a, periodically and exclusively from one another.

Memory 7a3 temporally stores the RSSI value and waveform data of the received radio wave.

Signal separator 1d is disposed between switcher 1s and antenna controller 1m, and is configured to: send out the beacon signal generated by MPU 7a to transmission antennas 11t to 14t, and distribute the reception signals of the radio waves received with reception antennas 11r to 14r between MPU 7a and spectrum analyzer 80.

Figure 4:
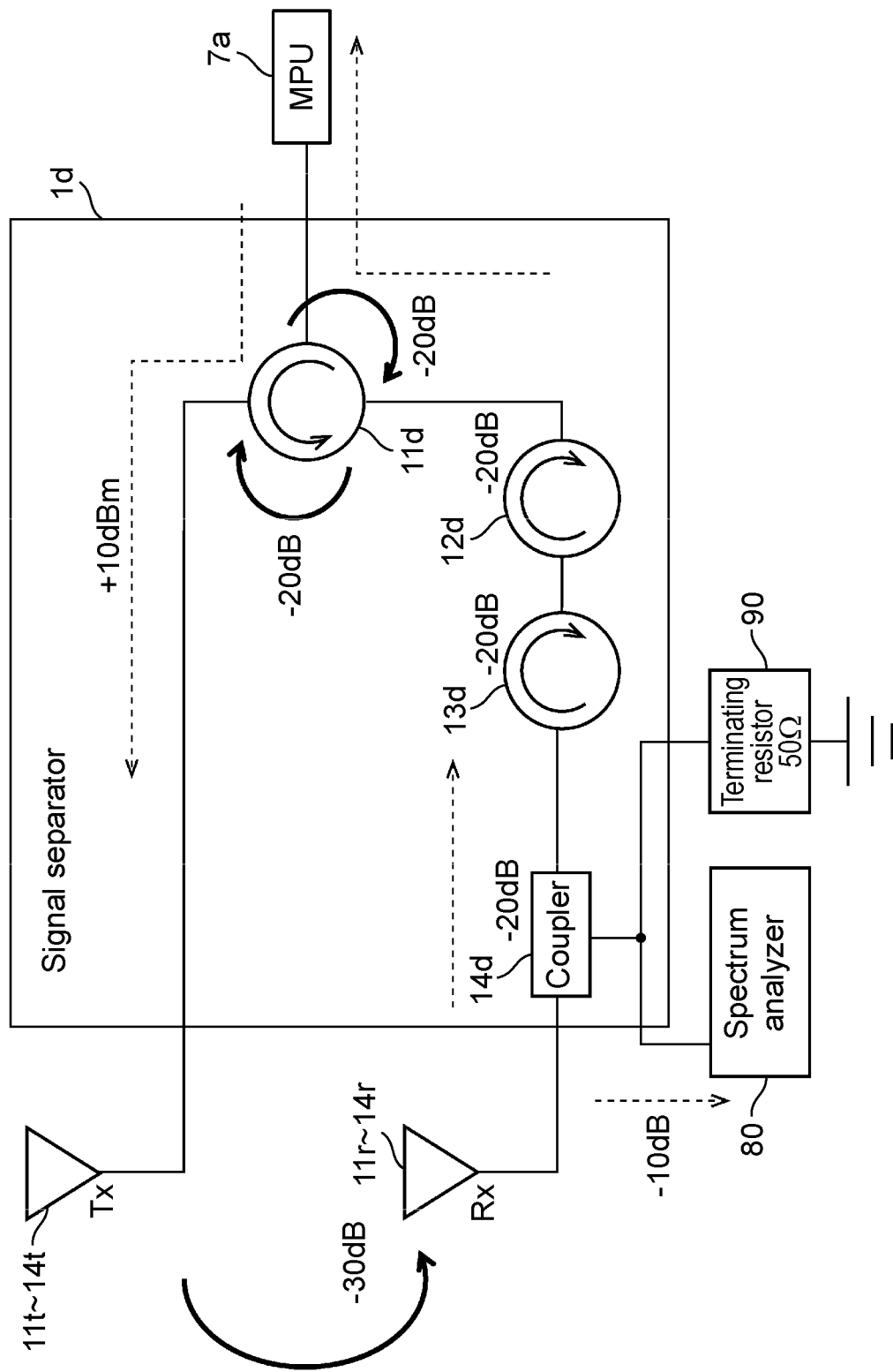
FIG. 4 is a configuration diagram illustrating an example of a signal separator.

FIG. 4 is a configuration diagram illustrating an example of signal separator 1d. Signal separator 1d is disposed between switcher 1s and antenna controller 1m, and includes: circulator 11d, two isolators 12d and 13d, and coupler 14d.

Circulator 11d, as one example of a connection circuit, is an electronic component with three terminals that has characteristics in which a signal entering it from one terminal is easy to take out from another terminal on a predetermined circulation-direction side but almost no output from the other terminal on the circulation-direction side opposite to the predetermined circulation-direction side. Specifically, circulator 11d as one example of the connection circuit is disposed between MPU 7a and transmission antennas 11t to 14t, and is configured to handle a beacon signal sent out from MPU 7a as follows: The circulator allows the beacon signal which turns counterclockwise (as shown in the Figure) to pass through it and to be sent out toward transmission antennas 11t to 14t, with almost no attenuation of level of the signal. On the other hand, the circulator greatly attenuates the level of the beacon signal which turns clockwise (as shown in the Figure) toward reception antennas 11r to 14r.

Each of isolators 12d and 13d is an electronic component with two terminals that has characteristics in which a signal entering it from one terminal is easy to take out from the other terminal and in which, on the contrary, a signal entering it from the other terminal is absorbed to give almost no output from the one terminal. Specifically, isolators 12d and 13d are disposed between circulator 11d and each of reception antennas 11r to 14r, and connected in series to the corresponding antenna. Isolators 12d and 13d allow the reception signal, which proceeds from each of reception antennas 11r to 14r, to pass through them toward circulator 11d, with the signal remaining at almost the same level. On the other hand, the isolators greatly attenuate the level of the beacon signal which sneaks into them from circulator 11d toward each of reception antennas 11r to 14r. Note that the number of isolators 12d and 13d is not limited to two, and may be one or three or more.

Coupler 14d is a distributor (one example of a directional coupler) disposed between isolator 13d and each of reception antennas 11r to 14r. Coupler 14d distributes the reception signal fed from each of reception antennas 11r to 14r into: a signal for waveform observation which proceeds toward spectrum analyzer 80, and a signal for measurement of an RSSI value which proceeds toward MPU 7a via two isolators 12d and 13d and circulator 11d. The input of spectrum analyzer 80 is connected with terminating resistor 90 (e.g. 50Ω) for impedance matching, thereby suppressing the reflection of the signal.

MPU 7a is fed with the reception signal which is sent from each of reception antennas 11r to 14r, distributed by coupler 14d, and then passed through two isolators 12d and 13d and circulator 11d. Then, using the reception signal, the MPU measures the RSSI value of the received radio wave. Spectrum analyzer 80 is an external signal-waveform measurement device for observing the spectral waveform of a radio wave; the analyzer makes possible the observation by generating waveform data of the radio wave on the basis of the reception signal that is fed from each of reception antennas 11r to 14r, with the reception signal being distributed by coupler 14d. Spectrum analyzer 80 sends out the thus-generated waveform data of the radio wave to MPU 7a. Moreover, spectrum analyzer 80 displays a two-dimensional graph on a screen, with the horizontal axis indicating a frequency and the vertical axis indicating a radio field intensity. With this operation, a user can observe the waveform of the received radio wave simultaneously with the measurement of the RSSI value of the received radio wave.

Now, levels of the following signals fed to spectrum analyzer 80 are discussed. That is, the level of the beacon signal that is sent out from MPU 7a and sneaks into the analyzer, and the levels of the reception signals that are fed from the reception antennas. For example, in the case where a beacon signal of +10 dBm is sent out from MPU 7a, the beacon signal is emitted from each of transmission antennas 11t to 14t as a radio wave (beacon), with the level being subjected to no attenuation by circulator 11d. On the other hand, the beacon signal sneaks into toward two isolators 12d and 13d, with the level being subjected to 20 dB attenuation by circulator 11d. The beacon signal having sneaked-in is subjected to 20 dB attenuation, two times, by two isolators 12d and 13d (that is, subjected to a total of 40 dB attenuation in the level), and then proceeds toward coupler 14d. Then, after having passed through two isolators 12d and 13d, the sneaking-in beacon signal is subjected to 20 dB attenuation by coupler 14d, and enters spectrum analyzer 80. The net result is that the beacon signal having sneaked-in decreases by 80 dB relative to the beacon signal proceeding to each of transmission antennas 11t to 14t, and enters spectrum analyzer 80 as a signal of −70 dBm (=10 dBm−20 dB−20 dB−20 dB−20 dB).

On the other hand, each of reception antennas 11r to 14r receives a radio wave transmitted from another wireless transmitter or radio wave measurement device, and outputs a reception signal of −20 dBm, for example, that is 30 dB less than the beacon signal of +10 dBm. This reception signal is distributed and 10 dB attenuated by coupler 14d, and then enters spectrum analyzer 80 as a signal of −30 dBm.

In this way, spectrum analyzer 80 is fed with the reception signal of −30 dBm and the beacon signal of −70 dBm. Since the level of the reception signal is 40 dB larger than that of the beacon signal, it is possible to observe, with spectrum analyzer 80, the waveform of the reception signal with no influence of the beacon signal.

Next, the operation of radio wave measurement device 10 according to the first embodiment will be described.

Radio wave measurement device 10 is capable of simultaneously performing, in each face of housing 10z i.e. a hexahedron, both the transmission operation by using each of transmission antennas 11t to 14t and the reception operation by using each of reception antennas 11r to 14r. In addition, radio wave measurement device 10 is capable of transmitting a radio wave of 2.4 GHz or 5 GHz from each of transmission antennas 11t to 14t, and simultaneously receiving a radio wave of 2.4 GHz or 5 GHz with each of reception antennas 11r to 14r. Note that radio wave measurement device 10 may be capable of transmitting both radio waves of 2.4 GHz and 5 GHz from each of transmission antennas 11t to 14t, and simultaneously receiving both radio waves of 2.4 GHz and 5 GHz with each of reception antennas 11r to 14r.

Radio wave measurement device 10 may be disposed at any location in an area to be measured. In the area, some other radio wave transmitter such as, for example, a wireless access point is installed. Moreover, in the area, another radio wave measurement device having the same configuration as radio wave measurement device 10 may be set as the other radio wave transmitter. Radio wave measurement device 10 receives a radio wave emitted by the wireless access point or a beacon emitted by another radio wave measurement device. Note that radio wave measurement device 10 may receive a beacon that is emitted by the device itself and reflected from something.

As one example, described below is the case where radio wave measurement device 10 transmits a horizontally polarized beacon from a transmission antenna and receives a vertically polarized radio wave with a reception antenna. Alternatively, on the contrary, the case may be such that radio wave measurement device 10 transmits a vertically polarized beacon from a transmission antenna and receives a horizontally polarized radio wave with a reception antenna. Here, in the case of radio wave measurement device 10 where the beacon transmitted from the device differs in polarization direction from the radio wave received by the device, the beacon transmitted from the transmission antenna is difficult to receive with the device's own reception antenna. Accordingly, the reception antenna cannot receive any beacon transmitted from the transmission antenna, and thus no reception signal of the beacon is fed, resulting in improved signal isolation. This, in turn, improves accuracy of the measurement of the RSSI value of a radio wave received with the reception antenna, and accuracy of the observation of the waveform of the radio wave. Note that radio wave measurement device 10 may be such that it transmits a horizontally polarized beacon from a transmission antenna and receives a horizontally polarized radio wave with a reception antenna. Alternatively, radio wave measurement device 10 may be such that it transmits a vertically polarized beacon from a transmission antenna and receives a vertically polarized radio wave with a reception antenna.

When radio wave measurement device 10 receives a radio wave with a reception antenna, MPU 7a measures the RSSI value of the received radio wave. In addition, MPU 7a receives the waveform data of the received radio wave from spectrum analyzer 80. MPU 7a associates the RSSI value with the waveform data, and stores them in memory 7a3. The RSSI value may also be associated with the waveform data by storing both of them in the same file or, alternatively, by mutually adding one's information to the other's meta-information before storing them in respective different files.

Moreover, radio wave measurement device 10 may be such that, in each face of housing 10z i.e. a hexahedron, the device includes pairs each of which is a pair of the transmission antenna to transmit a beacon and the reception antenna to receive a radio wave, and such that the polarization direction of the beacon transmitted and the polarization direction of the radio wave received are set to be different from each other, with different pairs having different combinations of the polarization directions of the beacon transmitted and the radio wave received. In this case, the radio wave measurement device may switch, in a time division manner, alternately between the pairs that have different combinations of polarization directions. For example, in one face, MPU 7a switches, in a time division manner, between the pair of the transmission antenna to transmit a horizontally polarized beacon and the reception antenna to receive a vertically polarized radio wave and the pair of the transmission antenna to transmit a vertically polarized beacon and the reception antenna to receive a horizontally polarized radio wave. Therefore, even in cases where, in an area, many radio waves are to be measured at many measurement sites and yet where many radio wave environments are to be measured at once, the radio wave measurement device can achieve signal isolation, highly accurately, of the radio wave to be measured with the device itself.

Next, results of the measurements of radio waves carried out by using radio wave measurement device 10 are shown below. The measurements were made in both an environment with high floor noise (including obstruction waves) and an environment with low floor noise. In each of the measurements, the observation of the waveform of a received radio wave by using spectrum analyzer 80 is performed simultaneously with the measurement of the RSSI value of the received radio wave by using MPU 7a.

Figure 5:
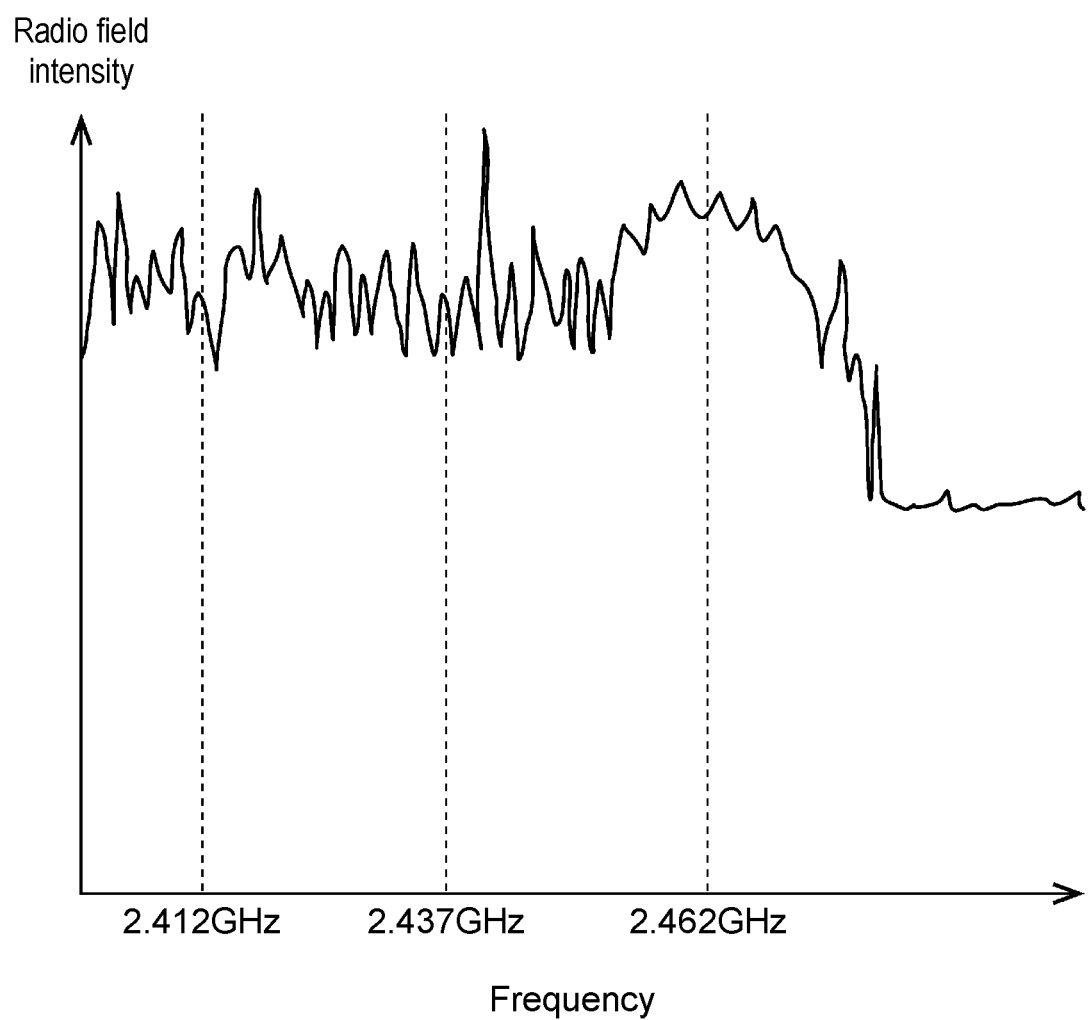
FIG. 5 is a graph showing the waveform of a radio wave received in a high floor noise environment.

FIG. 5 is a graph showing the waveform of a radio wave received in a high floor noise environment. The vertical axis of the graph indicates a radio field intensity (RSSI value) and the horizontal axis indicates a frequency. The radio wave to be measured is a radio wave in the 2.4 GHz band used in applications including Bluetooth (registered trademark), and a wireless Local Area Network (LAN) such as Wi-Fi (registered trademark), for example. Compared to the radio field intensity at 2.462 GHz for a communication channel, the graph waveform fluctuates a lot in bands (including 2.437 GHz and 2.412 GHz for communication channels) lower than that for the above-described communication channel, and the radio field intensity rises there due to floor noise (including obstruction waves). From this result, it turns out that, except the value measured at 2.462 GHz for the communication channel, the RSSI values measured with MPU 7a at 2.437 GHz and 2.412 GHz for the communication channels at lower frequencies than that of the exception, are not correct.

Figure 6:
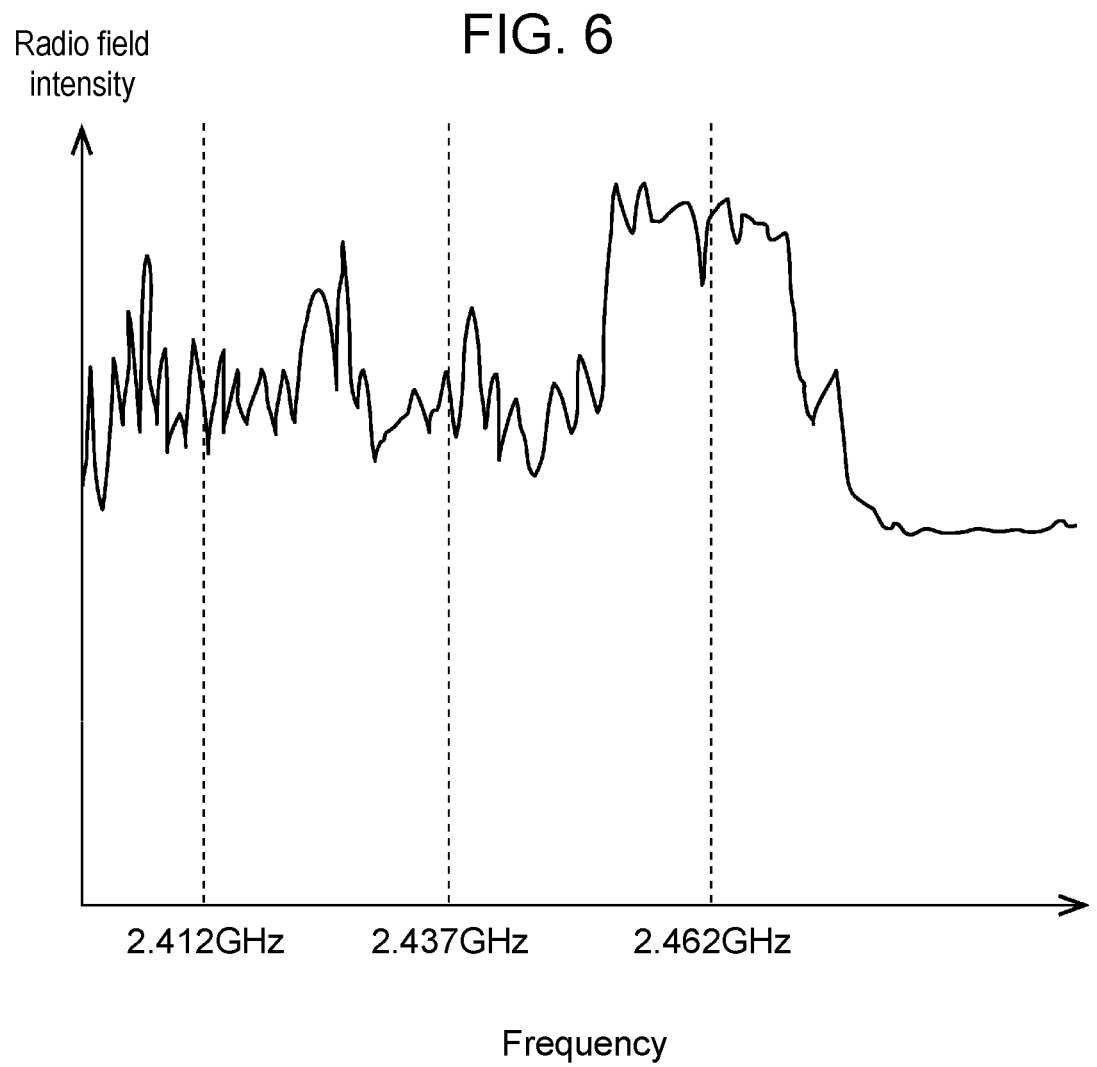
FIG. 6 is a graph showing the waveform of a radio wave received in a low floor noise environment.

FIG. 6 is a graph showing the waveform of a radio wave received in a low floor noise environment. The vertical axis of the graph indicates a radio field intensity and the horizontal axis indicates a frequency. As in the case of FIG. 5, the radio wave to be measured is a radio wave in the 2.4 GHz band. Compared to the radio field intensity at 2.462 GHz for the communication channel, floor noise is so low that the radio field intensity decreases in bands (including 2.437 GHz and 2.412 GHz for the communication channels) lower than that for the above-described communication channel. From this result, it turns out that, the RSSI values measured with MPU 7a at 2.462 GHz for the communication channel and also at lower frequencies, i.e. 2.437 GHz and 2.412 GHz for the communication channels, are correct.

With radio wave measurement device 10 according to the first embodiment, the reception signal of a radio wave received with reception antennas 11r and 14r is distributed by coupler 14d, and subjected to both the observation of the waveform with spectrum analyzer 80 and the measurement of the RSSI value with MPU 7a, simultaneously. Concurrently with this, the beacon signal sent out from MPU 7a toward transmission antennas 11t to 14t sneaks into spectrum analyzer 80. Fortunately, the beacon signal sent out from MPU 7a is greatly attenuated in level while passing through circulator 11d, greatly attenuated in level while passing through two isolators 12d and 13d, and further attenuated in level by coupler 14d, and then enters spectrum analyzer 80. In contrast, the reception signal of the radio wave received with each of reception antennas 11r to 14r is attenuated in level only by coupler 14d, and then enters spectrum analyzer 80. This leads to a great difference in level between these signals, which allows spectrum analyzer 80 to display the waveform of the radio wave received with the reception antenna, with almost no influence of the beacon signal having sneaked in. Through observation of the waveform of radio wave displayed on a screen of spectrum analyzer 80, a user can determine the degree of accuracy of the RSSI value of the received radio wave.

In this way, radio wave measurement device 10 includes: four transmission antennas 11t to 14t; four reception antennas 11r to 14r; and MPU 7a (one example of a main circuit) configured to output a beacon signal (one example of a transmission signal) to any of four transmission antennas 11t to 14t and to measure the strength of a reception signal received with any of four reception antennas 11r to 14r. Moreover, radio wave measurement device 10 includes: circulator 11d (one example of a connection circuit) that is disposed between MPU 7a and four reception antennas 11r to 14r and configured to reduce flowing of the transmission signal into each of four reception antennas 11r to 14r; and two isolators 12d and 13d (at least one isolator) that are disposed between circulator 11d and four reception antennas 11r to 14r and configured to reduce flowing of the transmission signal into four reception antennas 11r to 14r. Furthermore, radio wave measurement device 10 includes coupler 14d that is disposed between four reception antennas 11r to 14r and two isolators 12d and 13d. The coupler distributes the reception signal, and outputs the respective thus-distributed reception signals to both MPU 7a and external spectrum analyzer 80 (one example of a signal-waveform measurement device).

With this configuration, radio wave measurement device 10 is capable of reducing the sneaking of the transmission signal into the receiving circuit, which allows a simultaneous measurement of both the radio field intensity of the reception signal and the signal waveform of the reception signal. This enables support of efficient measurements of radio wave environments.

Moreover, MPU 7a associates the strength of the reception signal with the waveform data, which indicate the signal waveform of the reception signal, measured and generated by spectrum analyzer 80, and stores them in memory 7a3. This allows a user to confirm, at the same time, both the strength of the reception signal and the signal waveform of the reception signal, which thereby allows the user to check the presence or absence of obstruction waves even if the propagation characteristics of the radio wave fluctuate. This results in accurate measurements of radio wave environments.

Moreover, transmission antennas 11t and 14t transmit horizontally polarized signals in accordance with a beacon signal. Reception antennas 12r and 13r receive vertically polarized signals. This allows radio wave measurement device 10 to prevent the reception antennas from receiving the horizontally polarized signals that are transmitted from the device itself. This results in an increase in measurement accuracy of radio waves received with the reception antennas.

Furthermore, transmission antennas 12t and 13t transmit vertically polarized signals in accordance with a beacon signal. Reception antennas 11r and 14r receive horizontally polarized signals. This allows radio wave measurement device 10 to prevent the reception antennas from receiving the vertically polarized signals that are transmitted from the device itself. This results in an increase in measurement accuracy of radio waves received with the reception antennas.

In addition, four transmission antennas 11t to 14t include: transmission antennas 11t and 13t (one example of a first transmission antenna part) to emit beacons in the 2.4 GHz band (one example of a first communication frequency band), and transmission antennas 12t and 14t (one example of a second transmission antenna part) to emit beacons in the 5 GHz band (one example of a second communication frequency band). Four reception antennas 11r to 14r include: reception antennas 12r and 14r (one example of a first reception antenna part) to receive signals in the 2.4 GHz band, and reception antennas 11r and 13r (one example of a second reception antenna part) to receive signals in the 5 GHz band. With this configuration, radio wave measurement device 10 is capable of transmitting and receiving radio waves including: for example, radio waves in the 2.4 GHz band used in such as a wireless LAN and Bluetooth (registered trademark), and radio waves in the 5 GHz band used in a wireless LAN.

Moreover, four transmission antennas 11t to 14t include: transmission antennas 11t and 14t (one example of a third transmission antenna part) capable of emitting horizontally polarized beacons, and transmission antennas 12t and 13t (one example of a fourth transmission antenna part) capable of emitting vertically polarized beacons. Moreover, four reception antennas 11r to 14r include: reception antennas 11r and 14r (one example of a third reception antenna part) capable of receiving horizontally polarized signals; and reception antennas 12r and 13r (one example of a fourth reception antenna part) capable of receiving vertically polarized signals. Transmission antennas 11t and 14t and reception antennas 12r and 13r constitutes a pair, while transmission antennas 12t and 13t and reception antennas 11r and 14r constitutes another pair. MPU 7a selects one pair from the pair and the another pair by switching between the pair and the another pair alternately in a time division manner. This allows radio wave measurement device 10 to perform signal isolation, highly accurately, of many radio waves to be measured.

Moreover, radio wave measurement device 10 includes housing 10z, having a hexahedron shape, that is configured with six rectangular antenna-arrangement surfaces such that each of the six rectangular antenna-arrangement surfaces faces the corresponding one of the six rectangular antenna-arrangement surfaces. The pairs of the transmission antennas and the reception antennas are disposed on each of the six rectangular antenna-arrangement surfaces. With this configuration, radio wave measurement device 10 is capable of measuring radio waves arriving at each face of housing 10z being a hexahedron, allowing measurements of the radio wave environments of the whole space in an area.

Moreover, radio wave measurement device 10 is capable of transmitting a beacon from any one of transmission antennas 11t to 14t, and simultaneously receiving a signal with any one of reception antennas 11r to 14r. With this configuration, radio wave measurement device 10, when measuring radio waves in a specific area, can transmit a radio wave to another radio wave measurement device and the like, and simultaneously receive a radio wave in the area followed by measuring the RSSI value of the received radio wave. This allows efficient measurements of radio waves.

Moreover, four transmission antennas 11t to 14t and four reception antennas 11r to 14r are each a patch antenna having a rectangle shape. This permits the transmission antennas and the reception antennas to be downsized. In addition, the transmission antennas and the reception antennas are capable of efficiently transmitting and receiving, respectively, either vertically or horizontally polarized radio waves, with their polarization direction paralleling the longitudinal direction of the corresponding patch antenna.

Moreover, in each of the rectangular antenna-arrangement surfaces of housing 10z where the pairs of transmission antennas 11t to 14t and reception antennas 11r to 14r are disposed, transmission antennas 11t and 13t to transmit radio waves in the 2.4 GHz band are disposed outside the transmission antennas 12t and 14t to transmit radio waves in the 5 GHz band. Reception antennas 12r and 14r to receive radio waves in the 2.4 GHz band are disposed outside reception antennas 11r and 13r to receive radio waves in in the 5 GHz band. In the rectangular antenna-arrangement surface, this configuration allows the antennas, i.e. the transmission antennas and the reception antennas, to be disposed close to each other. Therefore, many transmission antennas and many reception antennas can be disposed there without any increase in size of the housing being a hexahedron.

Although various embodiments have been described above with reference to the accompanying drawings, it is needless to say that the present disclosure is not limited to such examples. It will be apparent to those skilled in the art that various alterations, modifications, substitutions, additions, deletions and equivalents can be conceived within the scope of the claims, and it should be understood that they also belong to the technical scope of the present disclosure. Each component in the embodiment described above may be combined freely in the range without deviating from the spirit of the disclosure.

For example, in the first embodiment described above, the case where the radio wave measurement device transmits and receives radio waves in the 2.4 GHz band and the 5 GHz band, has been described as one example. However, the radio waves are not limited to these frequencies. For example, the radio wave measurement device may transmit and receive radio waves used for specific low power radio, for example, in the bands of 920 MHz, 1200 MHz, and any other frequency.

Note that, in the first embodiment described above, circulator 11d has been described as one example of the connection circuit; however, the connection circuit is not limited to circulator 11*d*. The connection circuit may be a distributor intended to distribute an inputted signal into a plurality of signals, for example.

INDUSTRIAL APPLICABILITY

The present disclosure is useful in that it can provide a radio wave measurement device capable of, in measuring radio wave environments, reducing sneaking-in of a transmission signal into its receiving circuit, and thereby capable of simultaneously performing a measurement of the radio field intensity of a reception signal and a measurement of the waveform of the reception signal.

What is claimed is:

1. A radio wave measurement device, comprising:
   a transmission antenna;
   a reception antenna;
   a main circuit configured to output a transmission signal to the transmission antenna and measure a strength of a reception signal received with the reception antenna;
   a connection circuit disposed between the main circuit and the reception antenna, and configured to reduce flowing of the transmission signal into the reception antenna;
   at least one isolator disposed between the connection circuit and the reception antenna, and configured to reduce flowing of the transmission signal into the reception antenna;
   a coupler disposed between the reception antenna and the at least one isolator, the coupler being configured to distribute the reception signal to the main circuit and an external signal-waveform measurement device; and
   a housing having a hexahedron shape and configured with six rectangular antenna-arrangement surfaces, each of the six rectangular antenna-arrangement surfaces facing a corresponding one of the six rectangular antenna-arrangement surfaces,
   wherein the transmission antenna and the reception antenna constitute a pair disposed on each of the six rectangular antenna-arrangement surfaces.

2. The radio wave measurement device according to claim 1,
   wherein the main circuit stores the strength of the reception signal and the waveform data of the reception signal in association with each other, the waveform data indicating a signal waveform of the reception signal measured by the external signal-waveform measurement device.

3. The radio wave measurement device according to claim 1,
   wherein the transmission antenna transmits a horizontally polarized signal based on the transmission signal; and
   the reception antenna receives a vertically polarized signal.

4. The radio wave measurement device according to claim 1,
   wherein the transmission antenna transmits a vertically polarized signal based on the transmission signal; and
   the reception antenna receives a horizontally polarized signal.

5. The radio wave measurement device according to claim 1,
   wherein the transmission antenna includes:
      a first transmission antenna part configured to emit a signal in a first communication frequency band; and
      a second transmission antenna part configured to emit a signal in a second communication frequency band; and
   the reception antenna includes:
      a first reception antenna part configured to receive a signal in the first communication frequency band; and
      a second reception antenna part configured to receive a signal in the second communication frequency band.

6. The radio wave measurement device according to claim 1,
   wherein the transmission antenna includes:
      a third transmission antenna part capable of emitting a horizontally polarized signal; and
      a fourth transmission antenna part capable of emitting a vertically polarized signal;
   the reception antenna includes:
      a third reception antenna part capable of receiving a horizontally polarized signal; and
      a fourth reception antenna part capable of receiving a vertically polarized signal;
   the third transmission antenna part and the fourth reception antenna part constitute a pair and the fourth transmission antenna part and the third reception antenna part constitute another pair; and
   the main circuit selects one pair from the pair and the another pair by switching between the pair and the another pair alternately in a time division manner.

7. The radio wave measurement device according to claim 1, further configured to transmit a signal from the transmission antenna and simultaneously receive a signal with the reception antenna.

8. The radio wave measurement device according to claim 1, wherein the transmission antenna and the reception antenna are each a patch antenna having a rectangle shape.

9. The radio wave measurement device according to claim 5,
   wherein the transmission antenna and the reception antenna are each a patch antenna; and
   in cases where the first communication frequency band is lower in frequency than the second communication frequency band, in at least one of the six rectangular antenna-arrangement surfaces, the first transmission antenna part is disposed outside the second transmission antenna part and the first reception antenna part is disposed outside the second reception antenna part.

* * * * *